(12) United States Patent
Laux et al.

(10) Patent No.: US 7,682,447 B1
(45) Date of Patent: Mar. 23, 2010

(54) CEMENT CLINKER PRODUCTION WITH REDUCED EMISSIONS

(75) Inventors: Stefan Ernst Friedrich Laux, Williamsville, NY (US); Lee Jonathan Rosen, Buffalo, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 12/237,472

(22) Filed: Sep. 25, 2008

(51) Int. Cl.
 *C04B 7/36* (2006.01)
(52) U.S. Cl. ................................ 106/739; 106/761
(58) Field of Classification Search ............ 106/739, 106/761
 See application file for complete search history.

(56) References Cited

U.S. PATENT DOCUMENTS 2,882,033 A * 4/1959 Smith .................... 106/751
4,560,412 A * 12/1985 Weber .................... 106/741
4,913,742 A * 4/1990 Kwech .................... 106/745

OTHER PUBLICATIONS

DE 3426296 A (Jan. 30, 1986) Gardeik et al. abstract only.*
JP 2002173349 (Jun. 21, 2002) Onodera et al. abstract only.*
DE 19903954 A1 (Aug. 3, 2000) Ramesohl et al. abstract only.*
DD 268466 A1 (May 31, 1989) Danowski et al. abstract only.*
Machine Translation into English of JP 2002-173349 Jun. 21, 2002 (Onodera et al.).*

* cited by examiner

*Primary Examiner*—Paul Marcantoni
(74) *Attorney, Agent, or Firm*—Donald T. Black

(57) ABSTRACT

The carbon monoxide and hydrocarbon content of flue gas in a cement clinker production apparatus is lowered by feeding a high velocity stream of hot oxygen into the flue gas. Methods and apparatus for producing the hot oxygen stream are disclosed.

3 Claims, 3 Drawing Sheets

CEMENT CLINKER PRODUCTION WITH REDUCED EMISSIONS

FIELD OF THE INVENTION

The present invention relates to production of clinker from which cement can be produced by crushing the clinker and blending it with other materials to conform to desired specifications.

BACKGROUND OF THE INVENTION

Production of cement clinker can form offgas that contains among other hazardous air pollutants carbon monoxide (CO) or hydrocarbons or both. The present invention provides methods and apparatus that reduce the amounts of CO and hydrocarbons that are emitted in the production of cement clinker.

BRIEF SUMMARY OF THE INVENTION

One aspect of the present invention is a method of cement clinker production having a reduced tendency to emit carbon monoxide (CO), comprising (A) feeding cement clinker ingredients through a preheater comprising at least two preheating stages in series to form preheated ingredients, wherein the cement clinker ingredients may also contain hydrocarbons;

(B) feeding the preheated ingredients from the preheater through a calciner in which the preheated ingredients are calcined by heat which is provided by combustion within the calciner and by kiln flue gas passed into the calciner in step (D), thereby producing calcined ingredients and calciner flue gas;

(C) feeding the calcined ingredients through a kiln in which the calcined ingredients are converted to cement clinker by heat which is provided by combustion within the kiln, wherein said combustion forms kiln flue gas;

(D) passing the kiln flue gas out of the kiln, through a duct, into the calciner, wherein the kiln flue gas heats the preheated ingredients in the calciner;

(E) flowing the kiln flue gas and calciner flue gas after the calciner into at least two stages of said preheater to heat said cement clinker ingredients by heat transfer from said flue gases;

(F) mixing fuel and oxygen and combusting a portion of the oxygen in the mixture with said fuel in a chamber to form a hot oxidant stream emerging from an outlet in said chamber that contains oxygen, wherein the residence time of said combustion in said chamber is long enough that said hot oxidant stream has a temperature higher than 1600 F and said residence time is short enough that said hot oxidant stream contains products of said combustion in said chamber including radicals selected from the group consisting of radicals corresponding to the formulas O, H, OH, $C_2H$, $CH_2$, $C_jH_{2j+1}$ or $C_jH_{2j-1}$ wherein j is 1-4, and mixtures of two or more of such radicals;

(G) feeding the hot oxidant stream emerging from said outlet into flue gas in one or more of a preheating stage, the calciner, or the duct, effective to react with carbon monoxide in the flue gas into which said hot oxidant stream is fed.

Another aspect of the invention comprises feeding an oxygen-containing gas stream having an oxygen content higher than that of air into flue gas in said duct, effective to react with carbon monoxide in the flue gas into which said oxygen-containing gas is fed. In this aspect, the oxygen-containing gas is not necessarily provided by step (F) set forth above.

By "cement clinker ingredients" and "clinker ingredients" is meant a mixture of compounds which combine and interact together when the mixture is heated to temperatures sufficiently high enough to cause the compounds to melt and react together. The reaction forms "clinker", which is the reaction product formed by heating the clinker ingredients together so that they melt and interact. Cement is formed by pulverizing clinker to small particle size and combining it with other functional additives such as gypsum or flyash, in the preparation of a final commercial cement product.

The compounds which are present in cement clinker ingredients include limestone, a source of silica (most often sand), and sources of aluminates, ferrites and/or other silicates, typically in the form of one or more clay minerals.

DETAILED DESCRIPTION OF THE INVENTION

In the preheater the flue gases 25 coming from the calciner 7 are used to preheat clinker ingredients 1 that are fed to the preheater, which initially are usually at ambient temperature. In each stage of the preheater, heating by counter-current direct contact of the upflowing flue gases with the downwardly falling clinker ingredients is preferred.

Figure 1:
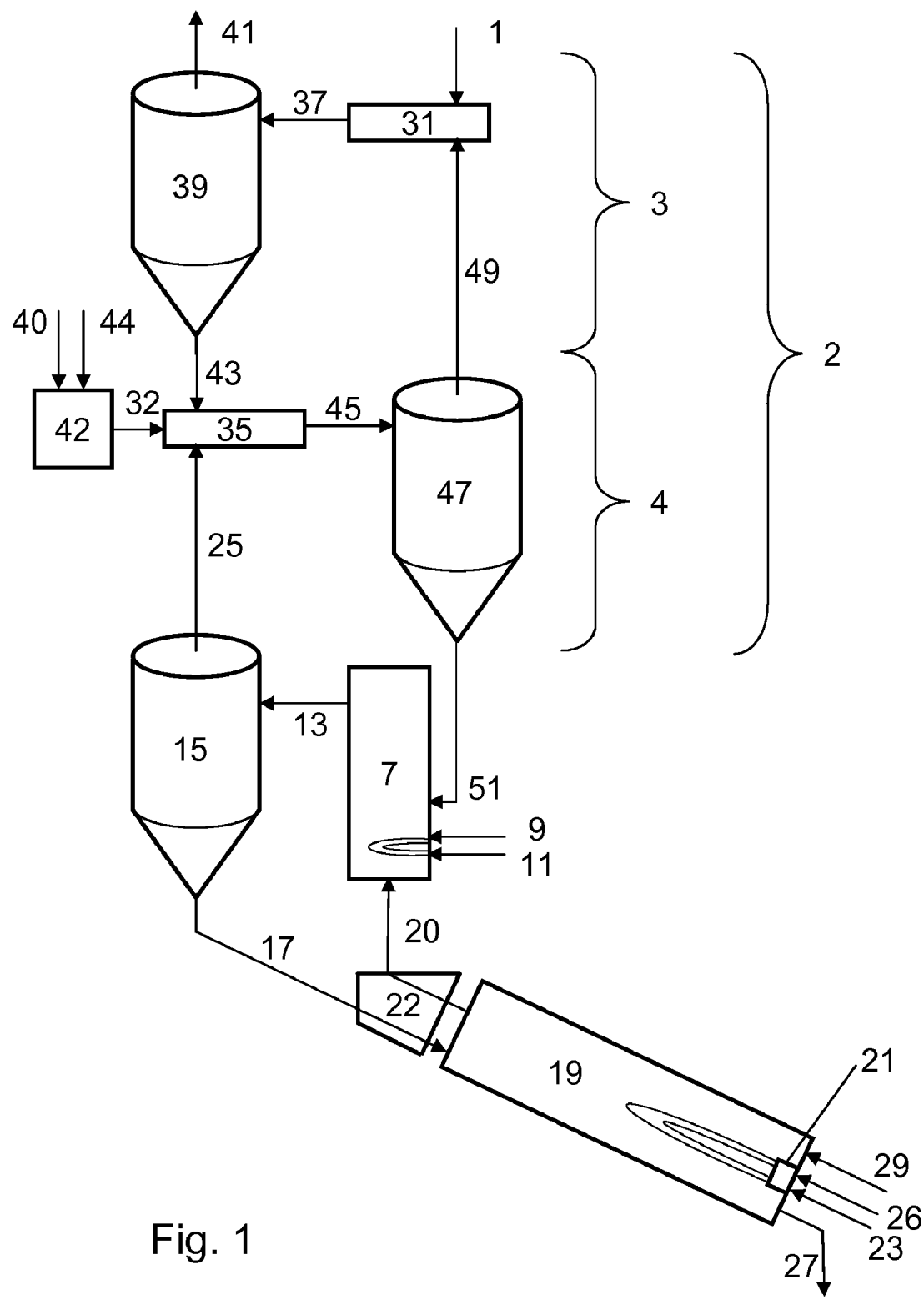
FIG. 1 is a schematic view of one embodiment of the present invention.

Referring to FIG. 1, stream 1 of cement clinker ingredients and flue gases 25 pass into preheater 2 comprising at least two preheating stages connected in series. Only two such stages 3 and 4 are depicted in FIG. 1, although in practice more than two such stages may be employed. In preheater 2 the clinker ingredients are heated by heat exchange from the flue gases, preferably as described below. The temperature of the clinker ingredients in the preheater is generally in the range of 50 F to 1500 F.

A "stage" is defined as an apparatus to which clinker ingredients and flue gases can be fed, within which heat transfer occurs (preferably by direct physical contact) from said flue gases to said clinker ingredients, and from which separated streams of said flue gases and thus-heated clinker ingredients can pass. A preferred example is a duct or other enclosed space to which are fed streams of clinker ingredients and of flue gas, in which the clinker ingredients and flue gas mix together to enable heat exchange, in combination with a separator (preferably a cyclone) which receives the mixture of clinker ingredients and flue gases and within which the solid clinker ingredients are separated from said flue gases, and from which said flue gases and said separated solids can separately pass. A stage can comprise separate pieces of apparatus, such as the aforementioned duct or other space together with the separator, or stage can comprise a unitary piece of apparatus within which the flue gas and the clinker ingredients are combined and then separated. There are preferably two or more stages connected in series, such that flue gases pass from a stage to another stage downstream in the direction of flow of flue gases through the preheater, and clinker ingredients and the separated solid particles can pass to another stage downstream in the direction of flow of clinker ingredients through the preheater.

Referring to FIG. 1, stage 3 comprises duct 31 and separator 39, and stage 4 comprises duct 35 and separator 47. Clinker ingredients 1 are fed to duct 31 and mix with, and are heated by contact with, hot flue gases which are fed to duct 31 as stream 49. The mixed flue gases and clinker ingredients then pass as stream 37 to separator 39 (which is preferably a cyclone). Separator 39 removes the suspended solid particles of clinker ingredients from the flue gases. Flue gases 41 pass from separator 39 to another stage, or (if stage 3 is the last stage in the direction of flow of the flue gases) to a unit where they can be used or treated as desired, or to the atmosphere. Solids 43 from the separator 39 pass to stage 4 which is downstream in the direction of flow of clinker ingredients through the preheater.

In stage 4, flue gases 25 and clinker ingredients 43 are fed to duct 35 where they contact each other to transfer heat to the clinker ingredients. Stream 45 of mixed flue gases and clinker ingredients is passed to separator 47 to separate the flue gases from the clinker ingredients. Flue gas stream 49 passes from separator 47 to duct 31, and solid clinker ingredients 51 pass to another stage or enter the calciner 7 which is described below, as shown in FIG. 1.

The preheated ingredients are conveyed from preheater 2 as stream 51 into calciner 7. Air 9, also referred to as tertiary air, and fuel 11 are combusted within calciner 7 to generate heat to calcine, that is, to convert limestone (calcium carbonate) to lime (calcium oxide). The temperature of the ingredients in the calciner is generally in the range of 1500 F to 1650 F. The calcined ingredients mixed with flue gases are conveyed from calciner 7 as stream 13 through separator (preferably cyclone) 15 for separation of the calcined ingredients from flue gases also exiting calciner 7. Heat to calcine the solid particles in stream 51 may alternatively be generated by a separate combustion chamber in which fuel and air are combusted and the hot combustion gases then fed to calciner 7. Various ways of providing heat and preheated solid particles to the calciner are known but these differences in design are considered immaterial to the invention.

Stream 17 of calcined ingredients from separator (cyclone) 15 is conveyed into kiln 19, which is preferably a rotary kiln of conventional design. At least a region within kiln 19, typically at the burner end, is heated to a temperature at least on the order of 2700 F by combustion of primary air 23 and secondary air 29 and fuel 26 at one or more burners 21. Primary air is fed closest to the point at which fuel is fed to the burner, and secondary air is fed at a greater distance from the point at which fuel is fed to the burner. Exposure of the clinker ingredients to the very high temperatures created within kiln 19 causes the clinker ingredients to interact to form the mixture of calcium silicates, calcium aluminates, and calcium ferrites and/or alumino-ferrites which are the conventional ingredients of cement clinker. Stream 27 of clinker leaves kiln 19, preferably at a temperature at least 2000 F or even at least 2500 F. The clinker is preferably passed through a heat exchanger in which the clinker is cooled by heat exchange with air which is then used as secondary and/or tertiary air. The clinker is then crushed and further treated to prepare it into commercial cement.

The combustion carried out within kiln 19 produces kiln flue gas stream 20 which is fed through a duct 22 into calciner 7, wherein the heat content of the kiln flue gases helps to promote the calcining reaction within calciner 7. It will be recognized that while streams 17 and 20 are shown originating separately in FIG. 1, these two streams may both be fed into and conveyed within the same duct 22. Stream 13, comprising calciner flue gases and kiln flue gases and calcined clinker ingredients, passes into separator (cyclone) 15 where the gas is separated from solids in the aforementioned stream 13. Flue gases emerge from cyclone 15 as stream 25 which is fed to preheater 2 where heat is transferred to incoming clinker ingredients from stream 1 to preheat the clinker ingredients.

The present invention preferably uses a hot oxygen generator 42 that generates a high velocity stream of hot oxidant and which is described further below. In FIG. 1, hot oxygen generator 42 provides a high velocity stream 32 of hot oxygen into stream 25 in preheater 2. One preferred location for feeding the stream 32 of hot oxygen is at the inlet through which flue gases pass into one of the preheater cyclones. Preferably, the hot oxygen stream is fed into duct 35 upstream of the bottom preheater cyclone, or to the cyclone next to the bottom, to take advantage of the higher flue gas temperatures in these locations. Where possible, the hot oxygen stream is fed at an elbow to be able to introduce it without having a lance or similar apparatus protruding into the passageway. Feeding the hot oxygen concurrent with the direction of the flue gas flow has the advantage that injection in this direction transfers momentum from the hot oxygen stream to the overall gas flow, resulting in an increase of static pressure downstream of the injection. This can reduce the duty of a fan used to induce draft from the kiln through the calciner and the preheating stages, resulting in lower power consumption. Feeding the hot oxygen stream into the one or more preheater stages is advantageous because the gas stream into which the hot oxygen stream is fed will tend to have a higher concentration of hydrocarbons and carbon monoxide than stream locations such as in duct 22 or in flue gases 25.

Figure 2:
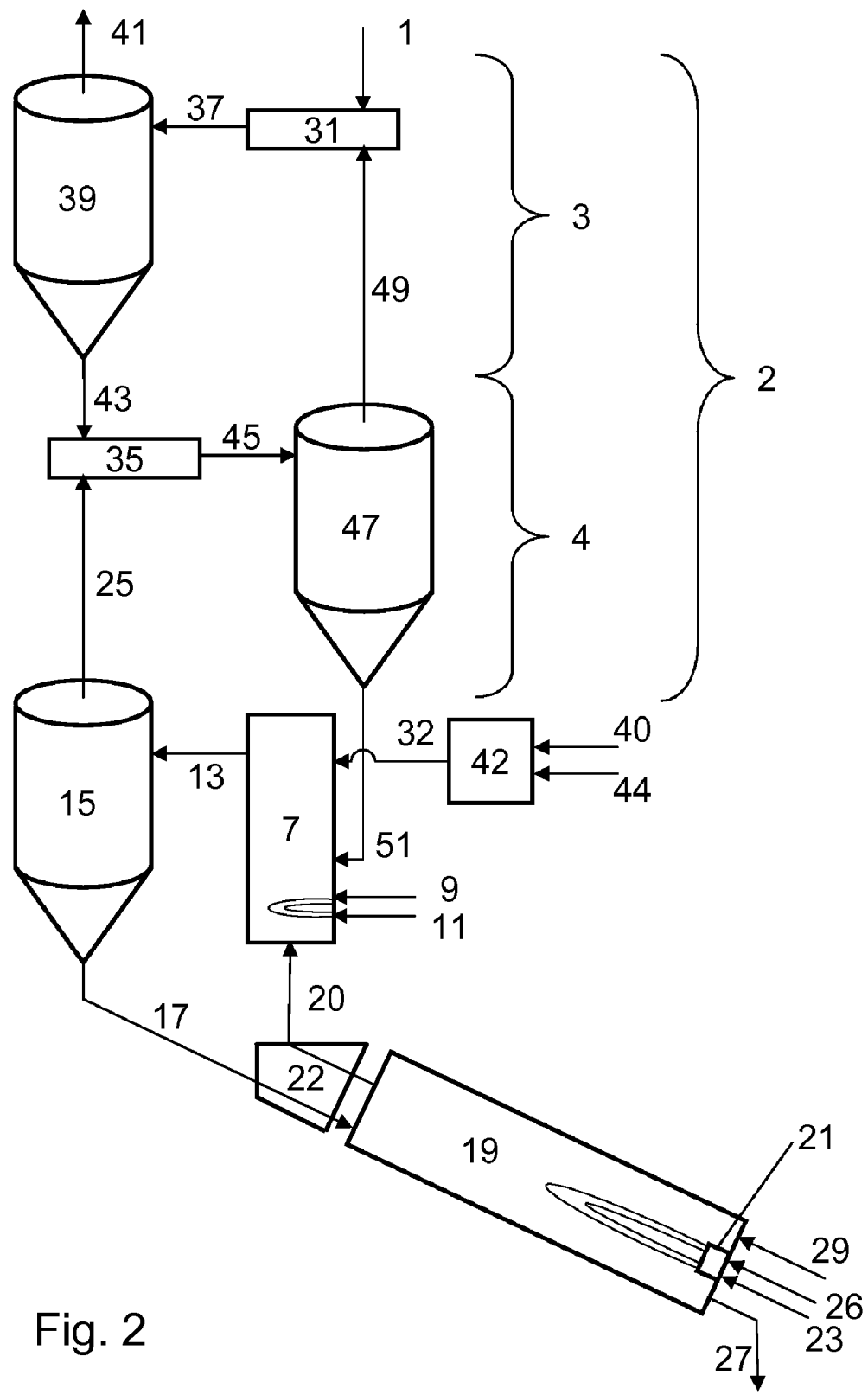
FIG. 2 is a schematic view of a second embodiment of the present invention.

Another useful embodiment of the present invention is shown in FIG. 2, in which reference numerals that also appear in FIG. 1 have the same meanings as in FIG. 1. In FIG. 2, the hot oxygen generator 42 feeds a stream 32 of hot oxygen into calciner 7, where because of the velocity and temperature of the hot oxygen stream it combines with the flue gases present in calciner 7 to bring about rapid reaction with carbon monoxide and hydrocarbons present in the flue gases, thereby reducing the content of carbon monoxide and hydrocarbons in stream 13 that exits from calciner 7. The temperature of the hot oxygen stream fed to calciner 7 is preferably at least 2000 degrees F., and more preferably at least 2500 degrees F. The velocity of the hot oxygen stream fed to calciner 7 is preferably 1000 feet per second, and more preferably 2000 feet per second. As was the case described above with respect to the hot oxygen stream fed to the preheater, the temperature and the velocity of the hot oxygen stream fed to calciner 7 must each be sufficiently high so as to bring about reaction with carbon monoxide, and with hydrocarbons if present, so as to reduce the carbon monoxide content (and the hydrocarbon content) in stream 13 compared to the case if all of the conditions were identical but the hot oxygen stream was not fed into calciner 7.

Figure 3:
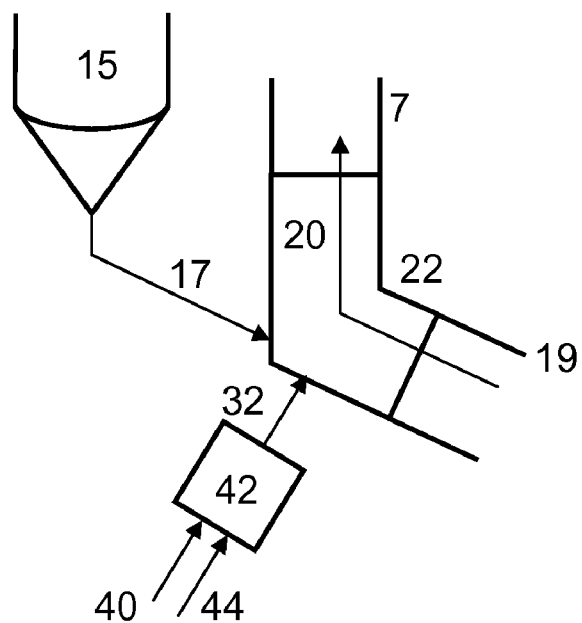
FIG. 3 is a schematic view of a third embodiment of the present invention.

A third embodiment of the present invention is shown in FIG. 3, in which reference numerals that also appear in FIG. 1 have the same meanings as in FIG. 1. FIG. 3 shows duct 22, and shows a stream 17 of heated, calcined cement clinker ingredients flowing from cyclone 15 through duct 22 toward the inlet of kiln 19. Stream 20 of kiln flue gases leaves the inlet of kiln 19 and flows through duct 22 toward calciner 7. Hot oxygen generator 42 feeds a stream 32 of hot oxygen into duct 22, into stream 20, preferably near stream 17.

In another embodiment of this invention, a stream of oxygen-containing gas is fed into duct 22 that is at ambient temperature (at least 25 C), where the temperature of the flue gas within duct 22 is at least 1200 F and more preferably at least 1400 F. That is, the stream of oxygen-containing gas fed in this region is not necessarily the hot oxygen stream described herein. In this embodiment, the oxygen-containing gas has an oxygen content higher than that of air, but preferably comprises at least 50 vol. % oxygen and more preferably at least 90 vol. % oxygen.

Figure 4:
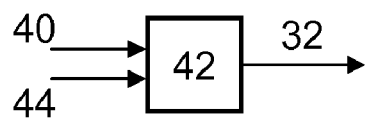
FIG. 4 is a schematic view of apparatus useful in the production of a stream of hot oxygen useful in the practice of the present invention.
Figure 5:
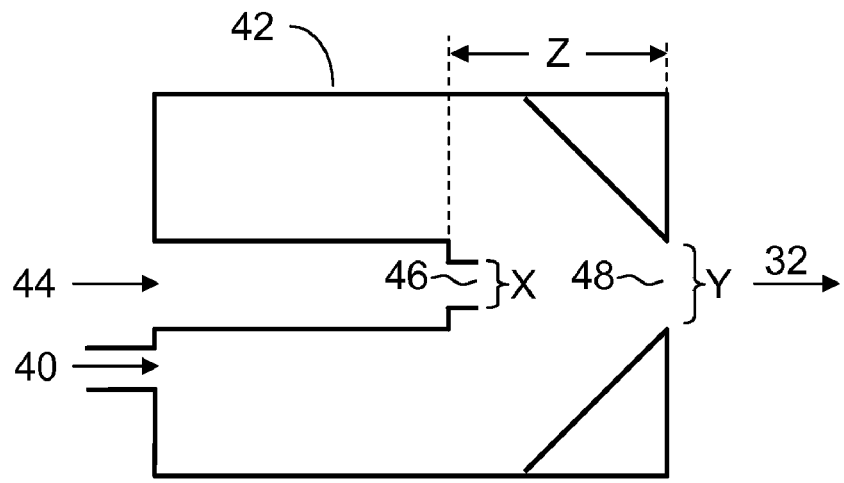
FIG. 5 is a cross-sectional view of a preferred embodiment of apparatus useful in the production of a stream of hot oxygen useful in the practice of the present invention.

A preferred embodiment of the hot oxygen generator 42 is illustrated in FIGS. 4 and 5. Referring first to FIG. 4, to provide the high velocity hot oxygen stream 32, stream 40 of oxidant having an oxygen concentration of at least 30 volume percent and preferably at least 85 volume percent is provided into hot oxygen generator 42 which is preferably a chamber, lance or duct. Most preferably the oxidant in stream 40 is technically pure oxygen having an oxygen concentration of 99.5 volume percent or more. The oxidant in stream 40 fed to the hot oxygen generator has an initial velocity which is generally within the range of from 50 to 300 feet per second (fps) and typically will be less than 200 fps.

Stream 44 of fuel is provided to the hot oxygen generator 42 through a suitable fuel nozzle which may be any suitable nozzle generally used for fuel injection. The fuel may be any suitable combustible fluid examples of which include natural gas, methane, propane, hydrogen, refinery fuel gas, landfill offgas, syngas, carbon monoxide, and coke oven gas. The presence of hydrogen in the fuel fed to the hot oxygen generator 42 is advantageous in assisting conversion of hydrocarbons and CO in the flue gas to $CO_2$ evidently because the combustion that forms the hot oxygen stream promotes the formation of (nonionic) OH and O radicals in the hot oxygen stream. Preferably the fuel is a gaseous fuel. Liquid fuels such as number 2 fuel oil may also be used, although it would be harder to maintain good mixing and reliable and safe combustion with the oxidant with a liquid fuel than with a gaseous fuel.

The fuel 44 provided into the hot oxygen generator 42 combusts there with oxidant 40 to produce heat and combustion reaction products such as carbon dioxide and water vapor. Preferably, no more than about 35 percent of the oxygen of the oxidant combusts with the fuel. If more than about 35 percent of the oxygen combusts with the fuel in the hot oxygen generator, then appropriate measures should be taken such as using refractory materials of construction and/or employing a heat removal feature such as a water wall to keep the temperature of the remaining oxygen from increasing to undesirable levels.

The combustion reaction products generated in the hot oxygen generator 42 may mix with some of the remaining oxygen of the oxidant (40), thus providing heat to some of the remaining oxygen and raising its temperature. Preferably, the fuel is provided into the hot oxygen generator 42 at a high velocity, typically greater than 200 fps and generally within the range of from 500 to 1500 fps. The high velocity serves to entrain oxidant into the combustion reaction products thus promoting combustion of the fuel in the chamber.

Generally the temperature of remaining oxidant within the hot oxygen generator is raised by at least about 500 F, and preferably by at least about 1000 F. It is preferred however that the temperature of the remaining oxygen not exceed about 3000 F to avoid overheating problems with supply ducts and nozzles.

As the temperature of the remaining oxygen within the hot oxygen generator (42) is increased, the requisite supply pressure of the oxidant to achieve any given oxidant injection velocity into the flue gas decreases. For example, for injection of the oxygen at ambient temperature the requisite pressure exceeds 7 pounds per square inch gauge (psig) in order to inject the oxygen into the flue gas at a velocity of 800 fps. As the oxygen temperature increases, the requisite pressure decreases sharply. At a temperature of 1500 F the requisite pressure is 1.65 psig and at a temperature of 3000 F the requisite pressure is only 0.91 psig. At temperatures exceeding 3000 F there is little additional benefit, thus providing another reason for not exceeding 35 percent oxygen combustion with the fuel. Thus, generation of hot oxygen in this manner can provide a high velocity hot oxygen stream (32) to the flue gas without the need for a high supply pressure thus reducing or eliminating the need for compressing oxidant prior to passing it into the flue gas which would otherwise be necessary if the oxidant source pressure is not high.

The combustion that occurs in hot oxygen generator 42 should be carried out in a manner such that the hot oxygen stream 32 that emerges from generator 42 contains one or more radicals corresponding to the formulas 0, H, OH, $C_2H$, $CH_2$, $C_jH_{2j+1}$ or $C_jH_{2j-1}$ wherein j is 1-4, and mixtures of two or more of such radicals. This can be achieved by providing that the residence time of the reactants (fuel and oxygen) within the hot oxygen generator 42 is long enough to enable combustion reaction of fuel and oxygen to occur in the hot oxygen generator 42 producing a stream having a temperature higher than 2500 F, and simultaneously providing that said residence time is short enough that at least some of the above-mentioned radicals are present. The residence time, in turn, is determined by the volume of the space within generator 42, by the feed rates of fuel stream 44 and of oxidant stream 40 into generator 42, and by the size of the exit orifice through which the hot oxygen stream 32 emerges from generator 42. Preferred residence times are about 1 to 2 msec.

Referring to FIG. 5, a cross-section of a hot oxygen generator 42 is shown. Fuel 44 emerges from orifice 46 whose diameter is "X". Oxygen stream 40 flows in front of orifice 46 and combusts with the fuel. The resulting hot oxygen stream 32 emerges from generator 42 through orifice 48, whose diameter is "Y". The distance from orifice 46 to orifice 48 is "Z". In general, the following are the combination of the dimensions of a hot oxygen generator, the fuel and oxygen feed rates to that generator, and the exit orifice dimensions, that provide residence time which can produce a hot oxygen stream that has the desired temperature and the desired content of combustion radicals so as to react with CO and any hydrocarbons that are present in the flue gas where the hot oxygen stream is fed:

X: 0.3-1.0 mm

Y: 1.5-2.65 mm

Z: 1.0-3.5 inches

Fuel (natural gas) feed rate into the generator: 2-14 scfh

Oxygen feed rate into the generator: 16-72 scfh

Pressure within the generator: 15.1-67.8 psia

The hot oxygen stream 32 preferably contains at least 75% (volume) $O_2$. A typical composition for this stream is about 80% $O_2$, 12% $H_2O$, 6% $CO_2$, some highly reactive radicals such as (nonionic) OH, O, and H which are particularly effective to initiate and oxidize CO to $CO_2$, and the aforementioned hydrocarbon radicals which promote reactions that lower the amount of NOx present. The hot oxygen stream 32 exits through orifice 48 and is fed into the flue gas at high velocity and momentum, which results in accelerated mixing between the hot oxygen stream and CO in the flue gas.

The hot oxygen stream 32 obtained in this way typically has a temperature of at least 1600 F and preferably at least 2000 F. Generally the velocity of the hot oxygen stream will be within the range of from 500 to 4500 feet per second (fps), preferably 800 to 2000 or to 2500 fps, and will exceed the initial velocity by at least 300 fps. In a preferred embodiment this velocity is at Mach 1. The description in U.S. Pat. No. 5,266,024, the content of which is hereby incorporated herein by reference, further describes formation of the high momentum hot oxygen stream.

The particular minimum temperatures and velocities for a given operation may vary as a function of the operating conditions of the clinker production apparatus, so it is best to express the minimum temperature and velocity as those which lead to a reduction of the amount of carbon monoxide and/or the amount of hydrocarbons in the flue gas exiting the last of the preheater stages from which it exits, as compared to the carbon monoxide and hydrocarbon contents of that flue gas stream without the injection of a hot oxygen stream as described herein. Furthermore, the hot oxygen stream should have an $O_2$ content of at least about 70 vol. percent, and more preferably at least about 80 vol. percent.

What is claimed is:

1. A method of cement clinker production in a kiln, the method having a reduced tendency to emit carbon monoxide, comprising
   (A) feeding cement clinker ingredients through a preheater comprising at least two preheating stages in series to form preheated ingredients, wherein the cement clinker ingredient may also contain hydrocarbons;
   (B) feeding the preheated ingredients from the preheater through a calciner in which the preheated ingredients are calcined by heat which is provided by combustion within the calciner and by kiln flue gas passed into the calciner in step (D), thereby producing calcined ingredients and calciner flue gas;
   (C) feeding the calcined ingredients through a kiln in which the calcined ingredients are converted to cement clinker by heat which is provided by combustion within the kiln, wherein said combustion forms kiln flue gas;
   (D) passing the kiln flue gas out of the kiln, through a duct, into the calciner, wherein the kiln flue gas heats the preheated ingredients in the calciner;
   (E) flowing the kiln flue gas and calciner flue gas after the calciner into at least two stages of said preheater to heat said cement clinker ingredients by heat transfer from said flue gases;
   (F) mixing fuel and oxygen and combusting a portion of the oxygen in the mixture with said fuel in a chamber to form a hot oxidant stream emerging from an outlet in said chamber that contains oxygen, wherein the residence time of said combustion in said chamber is long enough that said hot oxidant stream has a temperature higher than 1600° F. and said residence time is short enough that said hot oxidant stream contains products of said combustion in said chamber including radicals selected from the group consisting of radicals corresponding to the formulas O, H, OH, $C_2H$, $CH_2$, $C_jH_{2j+1}$ or $C_jH_{2j-1}$ wherein j is 1-4, and mixtures of two or more of such radicals;
   (G) feeding the hot oxidant stream emerging from said outlet into flue gas in one or more of a preheating stage, the calciner, or the duct, effective to react with carbon monoxide in the flue gas into which said hot oxidant stream is fed.

2. A method according to claim 1 wherein said cement clinker ingredients contain hydrocarbons.

3. A method of cement clinker production in a kiln, the method having a reduced tendency to emit carbon monoxide, comprising
   (A) feeding cement clinker ingredients through a preheater comprising at least two preheating stages in series to form preheated ingredients, wherein the cement clinker ingredients may also contain hydrocarbons;
   (B) feeding the preheated ingredients from the preheater through a calciner in which the preheated ingredients are calcined by heat which is provided by combustion within the calciner and by kiln flue gas passed into the calciner in step (D), thereby producing calcined ingredients and calciner flue gas;
   (C) feeding the calcined ingredients through a kiln in which the calcined ingredients are converted to cement clinker by heat which is provided by combustion within the kiln, wherein said combustion forms kiln flue gas;
   (D) passing the kiln flue gas out of the kiln, through a duct, into the calciner, wherein the kiln flue gas heats the preheated ingredients in the calciner;
   (E) flowing the kiln flue gas and calciner flue gas after the calciner into at least two stages of said preheater to heat said cement clinker ingredients by heat transfer from said flue gases; and
   (F) feeding an oxygen-containing gas stream having an oxygen content higher than that of air into flue gas in said duct, effective to react with carbon monoxide in the flue gas into which said hot oxidant stream is fed, wherein the temperature of said flue gas in said duct is at least 1200° F.

* * * * *